Oct. 18, 1932.  O. V. GREENE  1,883,715
ARMORED FILTER ELEMENT
Filed Sept. 20, 1928
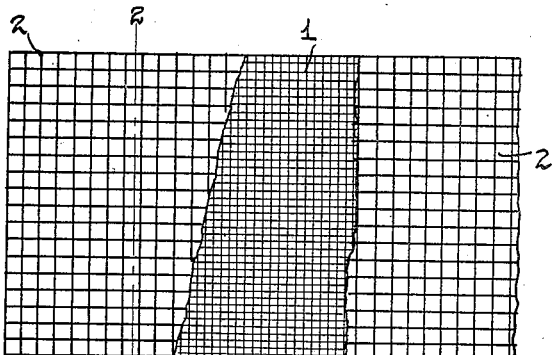
Fig. 1
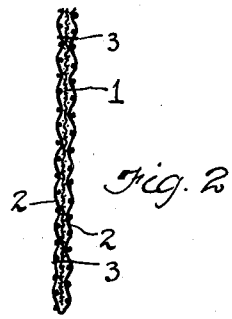
Fig. 2
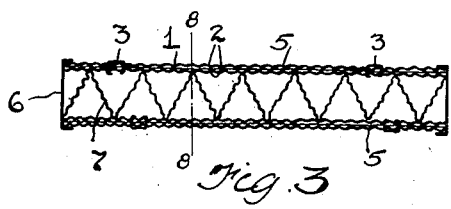
Fig. 3
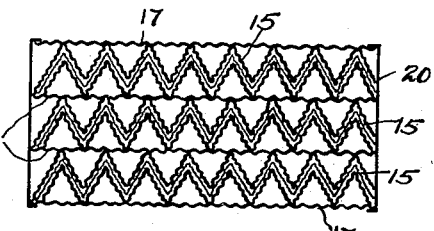
Fig. 4
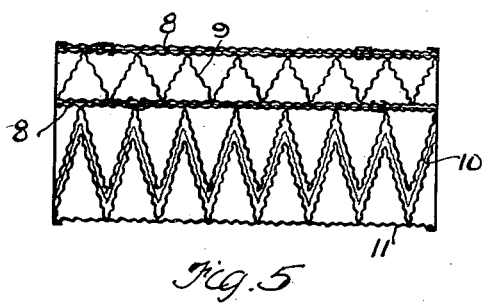
Fig. 5
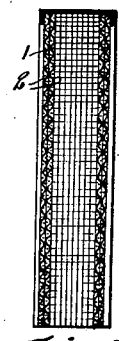
Fig. 8
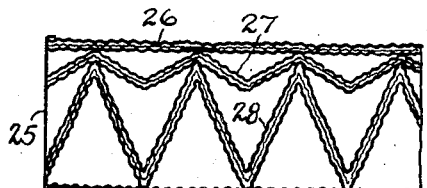
Fig. 7
Fig. 6
INVENTOR.
Oscar V. Greene
BY
Fay, Oberlin & Fay
ATTORNEYS.

Patented Oct. 18, 1932

1,883,715

UNITED STATES PATENT OFFICE

OSCAR V. GREENE, OF CLEVELAND, OHIO

ARMORED FILTER ELEMENT

Application filed September 20, 1928. Serial No. 307,130.

The present invention relates to filter elements and more particularly to a filter element for removing atmosphere dust from the air in which use is made of a non-metallic foraminous material such as cloth, or the like, which is normally of loose open texture and incapable of withstanding the stresses incident to the endless number of cleanings, to which it would be subjected in extended periods of service, and the use with such material of reticulated metal members so arranged as to support the non-metallic material in such a way that it can function as a filter and without being subjected to the stresses which would otherwise be imposed upon it, thereby greatly prolonging its useful life. This is accomplished preferably by using two sheets of woven wire screening, or the like, between which is placed the layer of cloth or similar stranded or uniformly thin felted material, the three sheets being secured together and such filter element is preferably built up into a filter unit by using two or more of the elements which are spaced from each other and so arranged that the air to be filtered must pass through the several layers in sequence. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a plan view of a filter element with a portion of the top member broken away to show the interior construction; Fig. 2 is a sectional view on the line 2—2 of Fig. 1; Fig. 3 is a sectional view through a filter unit showing one method of employing two elements to form a filter; Fig. 4 is a sectional view showing a different construction of filter unit; Fig. 5 is a sectional view showing still a different form of filter unit; Fig. 6 is a sectional view showing the element rolled up to form a cylindrical form of filter; Fig. 7 is a sectional view through another filter arrangement; and Fig. 8 is a section taken along the line 8—8 of Fig. 3.

The present invention is similar in general characteristics to filter constructions shown in my issued United States Patents Nos. 1,566,088, 1,639,132 and 1,639,133 particularly as to the manner of building the filter unit so that it may be readily cleaned. In the present construction of each filter element per se I have employed a sheet 1 of non-metallic material preferably an open woven cloth fabric such as a jute scrim of the type known as onion bag burlap having a relatively low resistance to air flow, the fabric itself frequently being so loosely or delicately textured as to be unsuited to withstand the rough usage it will encounter in service, particularly in the cleaning operation. To enable such material to be used as a filter I have employed a double sheet 2 of reticulated metal screen preferably in the form shown in Fig. 2; that is, a sheet folded on itself with the cloth 1 mounted between the two portions of the metal screen. This element is secured together by means of staples 3, or the like, and the metal screen is preferably of such size opening as to have substantially no filtering action and merely to act as an armor and support for the cloth filter mounted therebetween.

In forming a filter unit from such elements, it is usually necessary to employ more than one element and these elements are spaced apart from each other in such a manner that the air must pass through each element successively. Such form is shown in Fig. 3, in which I employ two elements 5 spaced apart in a casing 6 by means of a layer 7 of corrugated coarse mesh metal screen, one end of the casing being left open so that the dirt may be dropped out of the filter when it is rapped or jolted as is shown in my previous patents. In Fig. 5, a somewhat similar construction is shown in which two elements 8 are employed spaced apart by a corrugated coarse mesh screen member 9 and in addition to these two members a third element 10 is corrugated and placed between one of the first two elements, and a sheet 11 of coarse mesh reticulated material on the other side of the casing unit. In this construction, the corrugated element 10 provides a very greatly increased area or surface through which the air may be passed and so maintains a very low air resistance when more finely woven fabrics are employed. In Fig. 4 the filter unit is comprised of three corrugated elements 15 spaced from each other by means of sheets 16 of coarse mesh metal screening and having similar sheets 17 of coarse mesh metal screen at the outside edge of the casing 20. As illustrated there are three such elements, but the number will be varied depending upon the conditions to be met.

In Fig. 7 another modification is shown in which there is a casing or holding frame 25, a flat element 26 at one side thereof, a corrugated element 27 is mounted against the flat element, and a second corrugated element 28 with deeper corrugations is mounted against the first corrugated element, there being a sheet 29 of reticulated material at the other side of the casing. In this form the filter fabric of the flat element will be relatively coarse while the fabric of elements 27 and 28 will be increasingly finer. As the area of the elements 27 and 28 is increased, the resistance to air flow may thus be kept low and the filter housed in a small space.

In Fig. 6 I have shown an element such as illustrated in Fig. 1, rolled up into the form of a cylindrical filter, the element and a piece of corrugated metal screen being rolled together so as to obtain spacing between the convolutions of the element proper and in this form the filter unit is used in the same manner as the filter unit shown in my issued Patents Nos. 1,566,088, 1,639,132 and 1,639,133.

The present filter element is primarily intended for removing atmospheric dust from the air in ventilating systems, however, it has also been found effective for filtering oil as well as for cleaning air and gas, and for this latter use, the filter unit is preferably formed in the hollow cylinder in several layers as shown in Fig. 6, the oil passing through from one side to the other of the cylinder wall and then out through a suitable pipe on which the unit is mounted.

In cloth filters it has been usual to employ a single layer of rather closely woven more or less opaque fuzzy cloth which normally has a high initial resistance to the flow of air. In contrast to this, applicant's filter is constructed of several spaced layers of relatively coarse and openly woven diaphanous or translucent fabric such as jute scrim having a very low initial air resistance. In addition, the ordinary cloth filter is not armored and protected in any way and is therefore early subject to wear and tear of operation and is easily subject to injury, while in applicant's construction the layers of cloth are so protected that they are not subjected to stresses due to rough handling; types of cloth and similar material may be used which could not possibly be employed were it not for the armor or protective coverings; and the element may be fabricated into various shapes due to the pliability of the screen armor.

In addition, the use of several layers through which the air must pass successively, gives a large dust or dirt holding capacity and makes it possible to use layers of different mesh so that coarser materials will be taken out in one layer and finer dust particles taken out in successive layers.

In a filter of the present type, the filtering material should have as low a resistance to the passage of the air as possible and by using a material such as jute scrim, a filter foundation of very low resistance is furnished. This type of material, while of rather coarse mesh, is fibrous in its character and quickly takes out of the air the lint and fluff which builds up on the scrim, thus quickly forming a thicker, more efficient filter, and yet one which does not clog easily.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a filter, the combination of a holding frame having an open end, a series of alternating layers of filtering and non-filtering material mounted in said frame, said filtering layers comprising sheets of non-metallic filtering material enclosed in envelopes of folded metallic reticulated material, said non-filtering layers comprising sheets of coarse mesh reticulated metallic material, one of said layers being provided with bent portions adapted to space the layers from each other.

2. In a filter, the combination of a holding frame having an open end, a series of alternating layers of filtering and non-filtering material mounted in said frame, said filtering layers comprising sheets of non-metallic filtering material enclosed in envelopes of folded metallic reticulated material, said non-filtering layers comprising sheets of coarse mesh reticulated metallic material, one of said layers being provided with bent portions adapted to space the layers from each other, the spaces between the layers extending in the frame from one closed end to said open end, thus providing spaces through which collected filtered material may be withdrawn.

3. In a filter, the combination which comprises layers of filtering material spaced apart by layers of non-filtering material in contactual relation therewith, said filtering layers comprising a sheet of non-metallic filtering material enclosed in an envelope of metallic reticulated material and said non-filtering layers being bent to provide clean-out channels between said filtering layers.

4. In a filter, the combination which comprises a layer of flat material and a layer of crimped material in contactual relation, one of said layers being the filtering layer comprising a sheet of non-metallic material enclosed in an envelope of metallic reticulated material, and said crimped layer providing clean-out channels in said filter.

Signed by me this 18th day of September, 1928.

OSCAR V. GREENE.